A. Shaffer,
Churn.
No. 113,580. Patented Apr. 11, 1891.
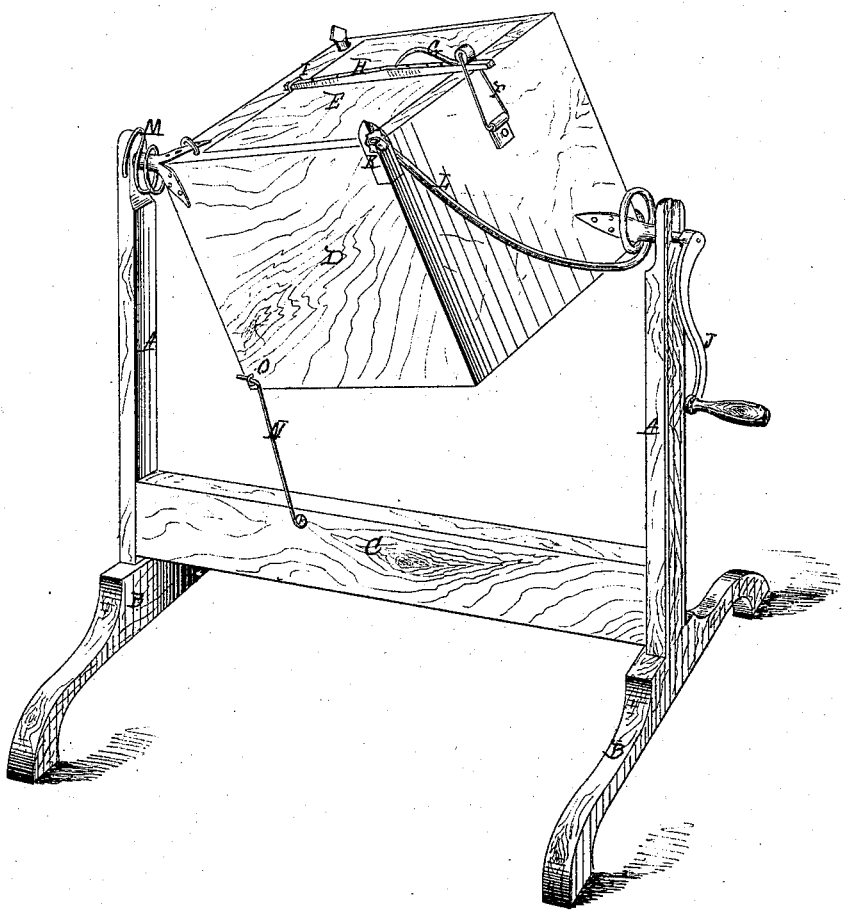
ATTEST
A. F. Dunlop
Martha Stewart
INVENTOR
A. Shafer
per atty
Thos. S. Sprague

United States Patent Office.

ABRAHAM SHAFFER, OF VANDALIA, MICHIGAN.

Letters Patent No. 113,580, dated April, 11, 1871.

IMPROVEMENT IN CHURNS.

The Schedule referred to in these Letters Patent and making part of the same.

*To whom it may concern:*

Be it known that I, ABRAHAM SHAFFER, of Vandalia, in the county of Cass and State of Michigan, have invented a new and useful Improvement in Rotary Churns; and I do declare that the following is a true and accurate description thereof, reference being had to the accompanying drawing and to the letters of reference marked thereon and being a part of this specification, in which my device is shown in perspective.

This invention relates to an improved construction of a churn or device for making butter, so arranged that at each rotation of the crank the cream traverses twice the length and breadth of the chamber in which it is confined, thereby receiving six several concussions, which are equivalent to a like number of strokes of a common dasher in breaking up the fatty globules of the cream.

The invention consists in the devices for supplying air to the interior of the cream-chamber, and in the general arrangement and combination of the various parts, as more fully hereinafter described.

In the accompanying drawing—

A represents a pair of vertical standards, supported by the feet B and connected together by the cross-tie C.

D is a cream-chamber, rectangular in shape, and provided with a door or trap, E, which, when in place, should close so tightly as not to allow any leakage of the contents of the chamber.

A link, F, pivoted to the end of the chamber, has, in turn, pivoted to itself a cam-lever, G, by means of which, in its engagement with the bar H, the door or trap is held in place.

The opposite end of this bar is secured by the staple I in the side of the chamber.

This chamber is journaled at diagonally-opposite corners to the standards A, and one of the journals is provided with a crank, J, by means of which a rotating and rocking motion is given to the cream-chamber.

K is a lip or semi-funnel, secured to one corner of the cream-chamber, which gathers and forces the air into the pipe L, which has its opposite end inserted into the diagonally-opposite corner upon the same end of the chamber.

Another pipe, M, leads from the other end of the cream-chamber, as shown, with its end bent back so that the opening will be presented to the reverse of the direction of the motion of the cream-chamber.

These two pipes L M are of a spiral form, as shown in the drawing, to prevent the cream from escaping while the chamber is being rotated from left to right, and, in their operation, cause a draught or current of air to enter said chamber through the pipe L and be discharged through the pipe M.

N is a hook pivoted to the cross-tie, and, engaging with the eye or staple O secured to the outside of the cream-chamber, holds the same in position, with the side provided with the trap or door uppermost.

After the fatty matter has been disengaged by the rotation of the cream-chamber from the milk the latter may be drawn off through a suitable hole provided with a stopper, P. Then a proper quantity of salt may be placed in the chamber, which should be again rotated until the butter has been gathered, cleaned, salted, and in a round ball ready for use.

What I claim as my invention, and desire to secure by Letters Patent, is—

1. In combination with the chamber D the spiral air-pipes L M, when constructed and operating as and for the purposes set forth.

2. The arrangement of the standard A, cross-tie C, cream-chamber D, door E, link F, cam-lever G, bar H, staple I, crank J, lip K, pipes L M, hook N, and staple O, in the construction of a rotating and rocking churn, when said parts are combined to operate as and for the purposes herein set forth.

ABRAHAM SHAFFER.

Witnesses:
CHAS. W. CLISBEE,
CHAS. S. WHEATON.